US011483520B1

(12) United States Patent
Morris (10) Patent No.: US 11,483,520 B1
(45) Date of Patent: Oct. 25, 2022

(54) SYSTEM FOR PREVENTION AND REMEDIATION OF ENVIRONMENTAL CONTAMINANTS IN MUNICIPAL SOLID WASTE AND RECYCLING FACILITIES

(71) Applicant: RUBICON TECHNOLOGIES, LLC, Lexington, KY (US)

(72) Inventor: Nathaniel Morris, Lexington, KY (US)

(73) Assignee: Rubicon Technologies, LLC, Lexington, KY (US)

( * ) Notice: Subject to any disclaimer, the term of this patent is extended or adjusted under 35 U.S.C. 154(b) by 0 days.

(21) Appl. No.: 17/535,956

(22) Filed: Nov. 26, 2021

(51) Int. Cl.
  *H04N 7/18* (2006.01)
  *G08B 21/12* (2006.01)
  *H04N 5/247* (2006.01)
  *G06V 20/52* (2022.01)

(52) U.S. Cl.
  CPC .............. *H04N 7/18* (2013.01); *G06V 20/52* (2022.01); *G08B 21/12* (2013.01); *H04N 5/247* (2013.01)

(58) Field of Classification Search
  CPC ................................ G06V 20/52; G08B 21/12
  See application file for complete search history.

(56) References Cited

U.S. PATENT DOCUMENTS

| 9,721,342 | B2* | 8/2017 | Mask | G06V 20/52 |
| 9,754,382 | B1* | 9/2017 | Rodoni | G06Q 10/30 |
| 10,798,522 | B1* | 10/2020 | Benjamin | G06K 9/6218 |
| 2015/0348252 | A1* | 12/2015 | Mask | H04N 7/188 |
| | | | | 382/103 |
| 2019/0130560 | A1* | 5/2019 | Horowitz | G06K 9/6254 |
| 2021/0081516 | A1* | 3/2021 | Storey | G06Q 10/087 |
| 2021/0158308 | A1* | 5/2021 | Armstrong | G06T 7/0008 |

* cited by examiner

*Primary Examiner* — Boubacar Abdou Tchoussou
(74) *Attorney, Agent, or Firm* — Kilpatrick Townsend & Stockton, LLP; Michael Morlock (57) ABSTRACT

A municipal solid waste or recycling facility tip assessment system, controller, and computer program provide remediation for environmental contaminant items dumped at a municipal solid waste or recycling facility. The controller monitors image stream(s) from image capturing device(s) positioned to have a field of view of a haul vehicle unloading waste or recycling articles that creates a hauler-load at a tip location. The controller recognizes within the image stream(s), based on the library, an image of a environmental contaminant item included in the waste articles. The controller generates an environmental contaminant item record that aggregates time, location, and image data that establish that the origin of the recognized environmental contaminant item was the haul vehicle. The controller transmits an alert to the prohibited waste remediation system based on the recognized environmental contaminant item record.

20 Claims, 10 Drawing Sheets

FIG. 6B even when a prohibited item is detected at a municipal solid waste landfill, it is nearly impossible to attribute the prohibited item to a particular haul vehicle responsible for depositing the prohibited waste item. Undetected, prohibited waste items at the municipal solid waste landfill pose a danger to

SYSTEM FOR PREVENTION AND REMEDIATION OF ENVIRONMENTAL CONTAMINANTS IN MUNICIPAL SOLID WASTE AND RECYCLING FACILITIES

TECHNICAL FIELD

The present disclosure relates generally to machine vision object detection systems, and more particularly, to machine vision object detection systems for the management of waste and recyclable materials.

BACKGROUND

Municipal waste and recyclable materials are typically collected by haulers and taken to municipal solid waste landfills and recycling facilities for disposal and/or recycling. Contaminants can turn otherwise recyclable materials into nothing more than trash and substantially increase overall recycling costs. This can occur when waste non-recyclable materials like food waste and plastic bags are comingled with recyclable materials, when recyclable materials are sorted improperly, or when recyclable materials are not properly cleaned prior to disposal. Such contamination can clog recycling machinery, reduce the quality and value of the recyclable products, and even make recycling impossible.

Similarly, industrial and hazardous waste materials are typically prohibited from municipal solid waste landfills. Industrial waste includes debris generated during the construction, renovation, and demolition of buildings, roads, and bridges. Industrial waste materials often contain bulky, heavy materials, such as concrete, wood, metals, glass and salvaged building components. Prohibited hazardous waste materials typically include flammable or ignitable waste; corrosive waste; reactive waste; toxic waste; and biohazardous or infectious waste. For example, hazardous materials such car batteries, fluorescent lightbulbs, freon refrigerants, hot water tanks, household cleaners, inks and resins, oil, fuel, propane tanks, paints and lacquers, tires, adhesives, and animal by-products are typically prohibited from municipal solid waste facilities. Prohibited items that are not detected and excluded from waste deposited at a municipal solid waste landfill pose significant risks to surrounding people, wildlife, and the environment at large. For that reason, industrial and hazardous waste materials must be disposed of at industrial and hazardous waste landfills, respectively, which are specifically designed to treat, handle, and store industrial and hazardous wastes to prevent such contamination and risk of harm.

While explicitly prohibited by the municipal solid waste landfill, haulers may nonetheless attempt to dispose of prohibited waste items at a municipal solid waste landfill, whether unscrupulously or unintentionally. Customers of the hauler may also be responsible for unscrupulously or unwittingly placing a prohibited waste item in a waste receptacle that then finds its way into the haul vehicle for disposal at a municipal solid waste landfill. It can be extremely difficult for municipal solid waste landfill operators and haulers to detect the presence of prohibited items among frequently large quantities of waste being collected or disposed of at a municipal solid waste landfill at any given time. Even when a prohibited item is detected at a municipal solid waste landfill, it is nearly impossible to attribute the prohibited item to a particular haul vehicle responsible for depositing the prohibited waste item. Undetected, prohibited waste items at the municipal solid waste landfill pose a danger to workers and individuals at the landfill and ultimately to the public as hazardous waste passes into the environment, contaminating ground water, air, and soil. Even if detected, remediation of the hazardous waste becomes the responsibility of the municipal solid waste landfill. A record establishing the origin of the hazardous waste for proving who should be held accountable or penalized for depositing prohibited items at a municipal solid waste landfill is not currently available. The disclosed system is directed to overcoming one or more of the problems set forth above and/or other problems of the prior art.

SUMMARY

In one aspect of the present disclosure, a system for prevention and remediation of environmental contaminants in municipal solid waste and recycling facilities includes a memory, a prohibited waste remediation system, at least one image capturing device, and a controller. The memory contains a library of one or more image characterizations of prohibited waste and recycling item and an image recognition engine. The at least one image capturing device is positionable to have a field of view of a tip location. The controller is communicatively coupled to the memory, the prohibited waste remediation system, and the at least one image capturing device. The controller is configured to monitor one or more image streams from the at least one image capturing device of a vehicle unloading waste and recycling articles that creates a hauler-load at the tip location. The controller is configured to recognize within the one or more image streams, based on the library, an image of an environmental contaminant item included in the waste and recycling articles. The controller is configured to generate an environmental contaminant item record that aggregates time, location and image data that establish that the origin of the recognized environmental contaminant item was the vehicle. The controller is configured to transmit an alert to the prohibited waste remediation system based on the recognized environmental contaminant item record.

In another aspect of the present disclosure, a municipal solid waste or recycling facility management controller a network interface communicatively coupled to a prohibited waste remediation system and at least one image capturing device positionable to have a field of view of a tip location. The municipal solid waste or recycling facility management controller includes a memory containing a library of one or more image characterizations of environmental contaminant item and an image recognition engine and a municipal solid waste or recycling facility management application. The municipal solid waste or recycling facility management controller includes a hardware processor communicatively coupled to the prohibited waste remediation system, the network interface, the memory, and the at least one image capturing device. The hardware processor executes the municipal solid waste or recycling facility management application to configure the municipal solid waste or recycling facility management controller to monitor one or more image streams from the at least one image capturing device of a vehicle unloading waste articles that creates a hauler-load at the tip location. The controller is configured to recognize within the one or more image streams, based on the library, an image of an environmental contaminant item included in the waste and recycling articles. The controller is configured to generate an environmental contaminant item record that aggregates time, location and image data that establish that the origin of the recognized environmental contaminant item was the vehicle. The controller is configured to transmit an alert to the prohibited waste remediation system based on the recognized environmental contaminant item record.

In an additional aspect of the present disclosure, a computer program product includes program code on a computer readable storage device. The program code enables the communication device to provide the functionality of monitoring one or more image streams from at least one image capturing device positioned to have a field of view of a vehicle unloading waste and recycling articles that creates a hauler-load at a tip location. The functionality includes recognizing within the one or more image streams, based on a library, an image of an environmental contaminant item included in the waste and recycling articles. The library is stored in memory communicatively coupled to the hardware processor and contains one or more image characterizations of an environmental contaminant item and an image recognition engine. The functionality includes generating an environmental contaminant item record that aggregates time, location, and image data that establish that the origin of the recognized environmental contaminant item was the vehicle. The functionality includes transmitting an alert to a prohibited waste remediation system based on the recognized environmental contaminant item record.

DETAILED DESCRIPTION

Figure 1:
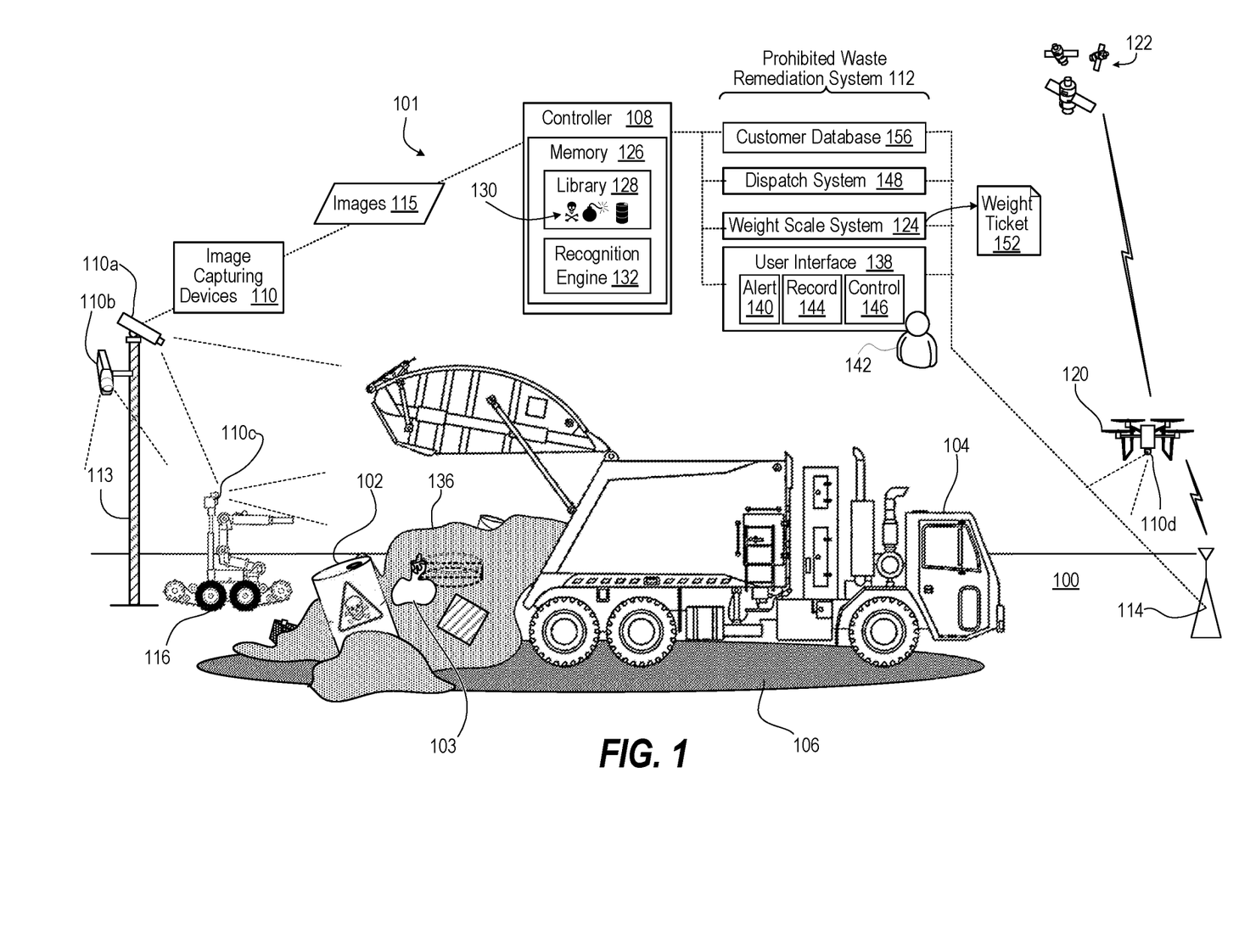
FIG. 1 is an isometric illustration of an exemplary disclosed municipal solid waste or recycling facility tip environment and tip assessment system.

FIG. 1 is an isometric illustration of an exemplary disclosed municipal solid waste or recycling facility tip environment 100 and assessment system 101. The term "municipal solid waste or recycling facility" refers to municipal solid waste landfills, recycling facilities, material recovery facilities (MRF), and the like. The terms "tip environment" and "tip location" refer to a location at a municipal solid waste or recycling facility where waste articles are tipped, unloaded, dumped, or otherwise deposited. The tip assessment system 101 provides an automated deterrent and remedy to environmental contaminant items 102 being dumped amongst authorized waste items 103 by haul vehicles 104 at a municipal solid waste or recycling facility tip location 106. The term "environmental contaminant" or "environmental contaminant item(s)" refers to prohibited items in the case of a municipal solid waste landfill, and contaminants in the case of a MRF or other recycling facility. In the context of recycling, the term "contaminant" and "contamination" may include prohibited items, and may further include food waste components, plastic bags, loose shredded-paper, brightly colored paper, hazardous waste, bio-hazardous waste, unrinsed or metal capped glass containers, incorrectly sorted recyclable materials, and/or any other non-recyclable item found within the recycling stream. The tip assessment system 101 may be managed by a controller 108 configured to visually recognize environmental contaminant items 102 that are in the field of view of image capturing devices 110 positioned to surveil the municipal solid waste or recycling facility tip location 106 and haul vehicles 104. In response to recognizing a environmental contaminant item 102, the controller 108 triggers one or more responses by a prohibited waste remediation system 112.

Image capturing devices 110 may be positioned on fixed (110a-110b), ground mobile (110c), or air mobile (110d) platforms. In the exemplary embodiment depicted in FIG. 1, image capturing devices 110a-110b are mounted to a pole 113 proximate to the municipal solid waste or recycling facility tip location 106. In one or more embodiments, each image capturing device 110a-110b is connected to electrical power or is self-sufficient with a solar panel or wind turbine and a battery pack. Each image capturing device 110a-110b may include a high-definition camera with optical zoom capability and motorized swivel. Certain optical processing capabilities may be resident in each image capturing device 110a-110b to compensate for lighting conditions or specific orientation of the municipal solid waste or recycling facility tip location 106. Each image capturing device 110a-110b may be wired or wirelessly connected to controller 108, such as via cellular or wireless network base node 114 to provide sequenced images or streaming video ("images") 115. Location of pole 113 and municipal solid waste or recycling facility tip location 106 may be statically determined for associating a location and a field of view with captured images 115. In another example, an image capturing device 110c may be mounted to a ground mobile platform, such as a robotic ground vehicle 116. In an additional example, an image capturing device 110d may be mounted to an airborne mobile platform, such as an aerial drone 120. The location of the ground vehicle 116 and the aerial drone 120 may be determined based on global positioning system (GPS) satellites 122, laser positioning, or other radio triangulation techniques. Similarly, in some embodiments, image capturing devices 110a-110b may include GPS or other location detection transponders such that they can be repositioned to different tip locations as needed. Other image capturing devices 110 may identify a particular haul vehicle 104 at locations other than municipal solid waste or recycling facility tip location 106, such as entering and exiting the municipal solid waste or recycling facility, while traveling to municipal solid waste or recycling facility tip environment 100, or at a weight scale system 124.

Controller 108 includes a memory 126 containing a library 128 of one or more image characterizations 130 of environmental contaminant items 102 and an image recognition engine 132 configured to analyze the images 115. Images 115 respectively received by the controller 108 from two or more of image capturing devices 110 may be identified that in combination may identify a first hauler-load 136 deposited by a particular haul vehicle 104 with image-based identification of the particular haul vehicle 104. The controller 108 may also maintain a continuity of surveillance of the first hauler-load 136 during: (i) an initial condition of waste items or no waste items at the municipal solid waste or recycling facility tip location 106 prior to arrival of haul vehicle 104; (ii) during tipping when a environmental contaminant item 102 may become visible; (iii) during periods left undisturbed to maintain situational awareness of the origin of the first hauler-load 136; (iv) during repositioning of the first hauler-load 136 that may reveal the environmental contaminant item 102; and (v) tipping of waste items from a subsequent haul vehicle 104 that comingle with previously tipped waste items. In some embodiments, multiple synchronized video views of a particular location or vehicle may be stored for later retrieval to identify a particular vehicle 104 responsible for tipping environmental contaminant item 102.

Tip assessment system 101 may alternatively be implemented according to an edge computing platform wherein each of image capturing devices 110a-d may be equipped with an independent controller 108, independently capture and process images 115 to identify and recognize particular haul vehicle 104, municipal solid waste or recycling facility tip location 106, hauler-load 136, authorized waste items 103, and environmental contaminant item(s) 102. Whether implemented as a centralized, distributed, or cloud system upon detecting environmental contaminant item 102 at municipal solid waste or recycling facility tip location 106, controller 108 may send an alert 140 to a prohibited waste remediation system 112.

Prohibited waste remediation system 112 may provide one or more ways to remediate a environmental contaminant item 102 detected as having been deposited at municipal solid waste or recycling facility tip location 106. In one or more embodiments, upon detection of a environmental contaminant item 102 at municipal solid waste or recycling facility tip location 106, the prohibited waste remediation system 112 may include a user interface device 138 that presents an alert 140 to enable a human operator 142 to intervene. Alert 140 may be accompanied by a prohibited waste record 144 that may be reviewed by the human operator 142 who may select a user control 146 to cancel the alert 140 if deemed a false alarm. In one or more embodiments, prohibited waste remediation system 112 includes a dispatch system 148 that directs personnel or a robotic agent such as robotic ground vehicle 116 or aerial drone 120 to further investigate, remove, or otherwise remediate the detected environmental contaminant item 102. In one or more embodiments, prohibited waste remediation system 112 includes weight scale system 124 that issues a weight ticket 152 or other notice to haul vehicle 104 including notice of the prohibited waste record 144 and an infraction penalty or warning. In one or more embodiments, the prohibited waste remediation system 112 includes record within a customer database 156 associating haul vehicle 104 with an associated prohibited waste record 144 and billing a responsible hauler for remediation costs.

Additional information about machine vision and artificial intelligence (AI) technology to enhance recognition of environmental contaminant items and identification of vehicles is described U.S. Pat. No. 10,713,599 B2, the disclosure of which is hereby incorporated by reference in its entirety. Therein, a system is disclosed for managing waste services. The system may include a waste detector mounted on a service vehicle and configured to capture image data of a receptacle encountered by the service vehicle. The system may also include a display and a controller in communication with the waste detector and the display. The controller may be configured to recognize the receptacle within the image data, and to determine a fill status of the receptacle based on the image data. The controller may also be configured to selectively determine a customer recommendation for a different sized receptacle based on the fill status, and to cause a dispatch to provide the different sized receptacle based on the customer recommendation.

Additional information about identification of the vehicles transiting the municipal solid waste or recycling facility by imaging and license plates is described in U.S. Pat. No. 10,204,324 B2, the disclosure of which is hereby incorporated by reference in its entirety. Therein, a system is disclosed for managing an offloading service performed by a service vehicle at a disposal site. The system may have an identity detection device configured to generate an identity signal associated with the service vehicle at the disposal site, a scale configured to generate a weight signal indicative of an amount of waste material disposed of by the service vehicle at the disposal site during the offloading service, and at least one processing unit in communication with the identity detection device and the scale. The at least one processing unit may be configured to correlate the weight signal to a customer for which the service vehicle previously performed an onloading service based on the identity signal, and automatically generate an invoice for the customer for the onloading service and for the offloading service.

Figure 2:
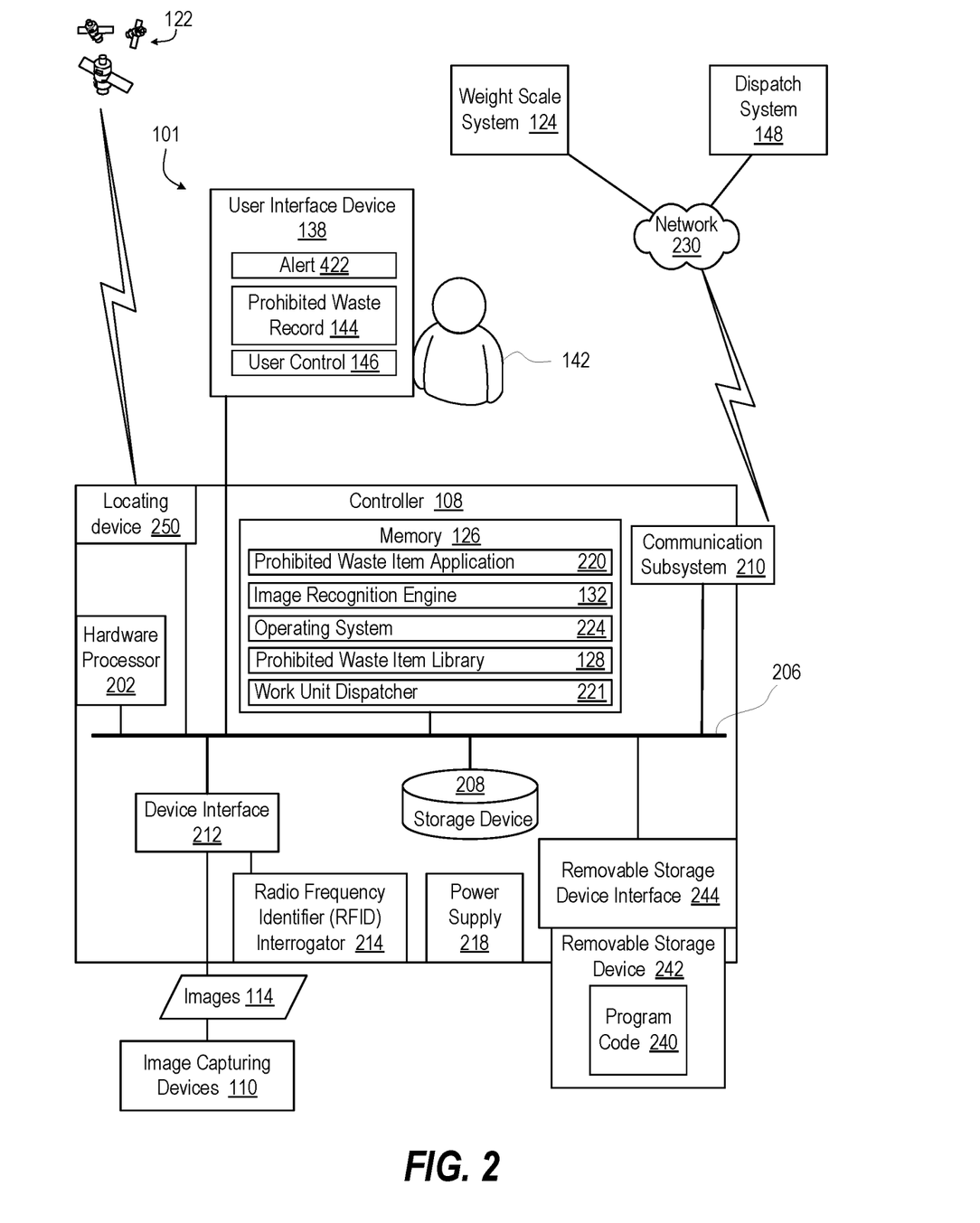
FIG. 2 is a diagrammatic illustration of the exemplary disclosed system of FIG. 1 that may be used to manage the municipal solid waste or recycling facility tip environment of FIG. 1.

FIG. 2 is a diagrammatic illustration of the exemplary disclosed system of FIG. 1 that may be used to manage the municipal solid waste or recycling facility tip environment of FIG. 1. For clarity, controller 108 is depicted as a unitary component; however, controller 108 may have a distributed architecture of communicatively coupled components that are physically separated. For purposes of this disclosure, controller 108 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, controller 108 may include one or more of a handheld computing device, microcontroller, embedded system, personal computer, server, programmable logic controller (PLC); field programmable gate array (FPGA), network storage device, or any other suitable device and may vary in size, shape, performance, and overall functionality. Controller 108 may include random access memory (RAM), one or more processing resources such as central processing units (CPUs), tensor processing units (TPUs), or hardware or software control logic, ROM, and/or other types of nonvolatile memory. Additional components of controller 108 may include one or more disk drives, one or more network ports for communicating with other components of controller 108 or other external devices, as well as various input and output (I/O) devices.

In the embodiment illustrated in FIG. 2, controller 108 includes a hardware processor 202, memory 126, hardware processor 202, storage device 208, communication subsystem 210, and a device interface 212. Device interface 212 may be coupled to one or more internal peripheral devices such a radio frequency identifier (RFID) interrogator 214 illustrated in FIG. 2, and/or external peripheral devices such as image capturing devices 110 illustrated in FIG. 2. A power supply 218 may be electrically coupled to controller 108. Controller 108 may further include system interconnect 206, which may communicatively connect one or more components of controller 108. System interconnect 206 may be interchangeably referred to as a system bus in one or more embodiments. System interconnect 206 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Hardware processor 202 may include any system, device, or apparatus configured to interpret and/or execute program instructions and/or process data, and may include, without limitation a microprocessor, microcontroller, digital signal processor (DSP), Application Specific Integrated Circuit (ASIC), or any other digital or analog circuitry configured to interpret and/or execute program instructions and/or process data such as environmental contaminant item library 128, image recognition engine 132, environmental contaminant item application 220, work unit dispatcher 221, and operating system 224. In some embodiments, hardware processor 202 may interpret and/or execute program instructions and/or process data stored in memory 126 and/or another component of controller 108. Memory 126 may be communicatively coupled to hardware processor 202 and may include any system, device, or apparatus configured to retain program instructions and/or data for a period of time (e.g., computer-readable media). By way of example without limitation, memory 126 may include RAM, ROM, EEPROM, a PCMCIA card, flash memory, magnetic storage, opto-magnetic storage, or any suitable selection and/or array of volatile or non-volatile memory.

Communication subsystem 210 may include any suitable system, apparatus, or device operable to serve as an interface between controller 108 and network 230. User interface device 138 may be communicatively coupled to controller 108 as an integral component, a peripheral component, or a remote component. Communication subsystem 210 may enable controller 108 to communicate over network 230 to remote components. In one or more embodiments, controller 108 may locally support functions such as work unit dispatcher 221. In one or more embodiments, work unit dispatcher 221 may provide a functional interface to dispatch system 148 may be remote to the controller 108. The network 230 may use any suitable transmission protocol and/or standard, including without limitation all transmission protocols and/or standards enumerated herein with respect to the discussion of network 230.

Controller 108 may be configured with program code 240 stored on computer readable medium such as a removable storage device 242 that is inserted into a removable storage device interface 244. The program code 240 may provide at least in part the functionality described herein. In one or more embodiments, the program code 240 is provisioned in memory 126 or storage device 208 at an original equipment manufacturer (OEM) or downloaded via network 230.

Controller 108 may include a locating device 250 configured to generate signals indicative of a geographical position and/or orientation of controller 108, which may be mounted to one of the fixed or mobile platforms described herein or remotely utilizes antennas on one of the fixed or mobile platforms to provide location services relative to a local reference point, a coordinate system associated with municipal solid waste or recycling facility environment 100, a coordinate system associated with Earth, or any other type of 2-D or 3-D coordinate system. For example, locating device 138 may embody an electronic receiver configured to communicate with satellites 122, or a local radio or laser transmitting system (not shown) used to determine a relative geographical location of controller 108 within municipal solid waste or recycling facility environment 100. Locating device 138 may receive and analyze high-frequency, low-power radio or laser signals from multiple locations to triangulate a relative 3-D geographical position and orientation. In some embodiments, locating device 138 may also be configured to determine a location and/or orientation of a facility vehicle 304 (shown only in FIG. 3C), robotic ground vehicle 116, and/or aerial drone 120. Based on the signals generated by locating device 138 and based on known kinematics of haul vehicle 104, controller 130 may be able to determine in real time, the position, heading, travel speed, acceleration, and orientation of haul vehicle 104. This information may then be used by and/or offboard controllers 130, 132 to update the locations and conditions of haul vehicle in an electronic map or database of municipal solid waste or recycling facility environment 100.

The disclosed tip assessment system 101 may be applicable to the waste and recycling service industry, where visual detection and remediation of environmental contaminant item 102 avoids detrimental effects on the environmental health. Economic efficiency is realized by automating a time-consuming human endeavor to inspect the entirety of hauler-load 136 deposited by each haul vehicle 104 being dumped at municipal solid waste or recycling facility that is not configured to safely store such. The disclosed tip assessment system 101 may also be able to tailor responses to the type and size of environmental contaminant items 102 to direct a specific remediation. By maintaining evidentiary tracking of the source of environmental contaminant items 102, tip assessment system 101 may also facilitate notification of an infraction and/or compensation for the remediation resulting from dumping a environmental contaminant item 102 to a responsible hauler and/or haul vehicle 104.

Figures 3A, 3B:
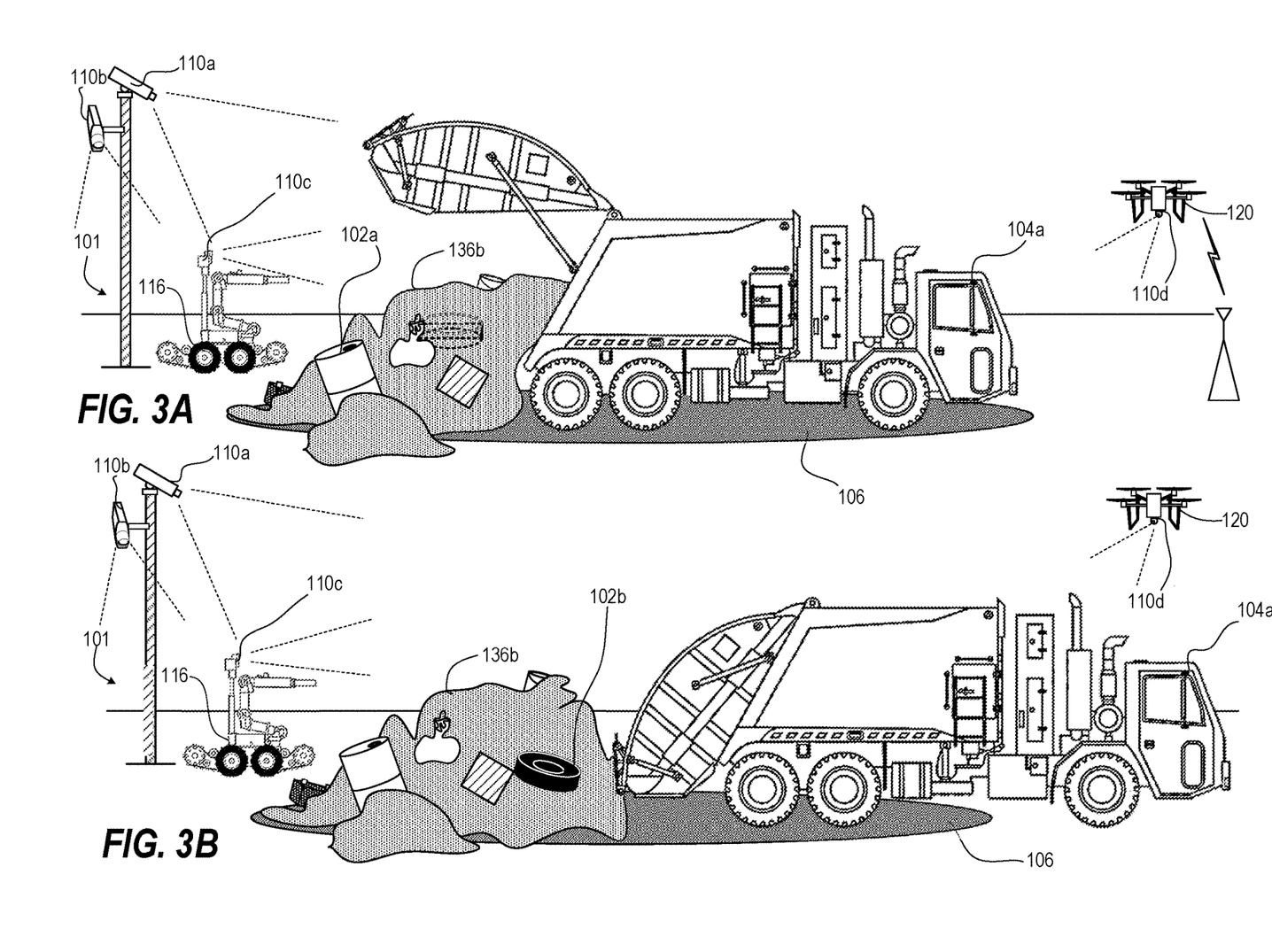
FIG. 3A is an isometric illustration of the municipal solid waste or recycling facility tip environment monitored by the tip assessment system of FIG. 1 depicting a first haul vehicle unloading a first hauler-load.
FIG. 3B is a second sequential isometric illustration of the municipal solid waste or recycling facility tip environment monitored by the assessment system of FIG. 1 as the first haul vehicle departs from the municipal solid waste or recycling facility tip location after having deposited the first hauler-load.

FIGS. 3A-3G depict a sequence of isometric illustrations of tip location 106 monitored by the tip assessment system 101. FIG. 3A is a first sequential isometric illustration of tip location 106 monitored by the tip assessment system 101 as a first haul vehicle 104a unloads waste items forming an initial first hauler-load 136a. In particular, a first environmental contaminant item 102a, specifically a chemical barrel, is visible during tipping of first haul vehicle 104a. Image capturing devices 110a-110c have vantage points to identify first haul vehicle 104a prior to dumping, and to monitor initial first hauler-load 136a as waste items are unloaded at tip location 106. By capturing images before and during tipping, image capturing devices 110a-110c are afforded an increased opportunity to identify first environmental contaminant item 102a as it is unloaded from first haul vehicle 104a before environmental contaminant item 102a potentially becomes buried under remaining waste or recycling items being unloaded into first hauler-load 136a. Image capturing device 110d has a vantage point to identify the first haul vehicle 104a, but may not have a vantage point of all waste items as they are tipped from first haul vehicle 104a.

FIG. 3B is a second sequential isometric illustration of tip location 106 monitored by the tip assessment system 101 as first haul vehicle 104a departs from tip location 106 and the completed first hauler-load 136b. As completed first hauler-load 136b settled, a second prohibited item 102b becomes visible, specifically a vehicle tire. Image capturing devices 110a-110c have vantage points to monitor the completed first hauler-load 136b, including environmental contaminant items 102a and 102b. Image capturing device 110d has a vantage point to identify the first haul vehicle 104a, but may not have a vantage point of completed first hauler-load 136b.

Figure 3C:
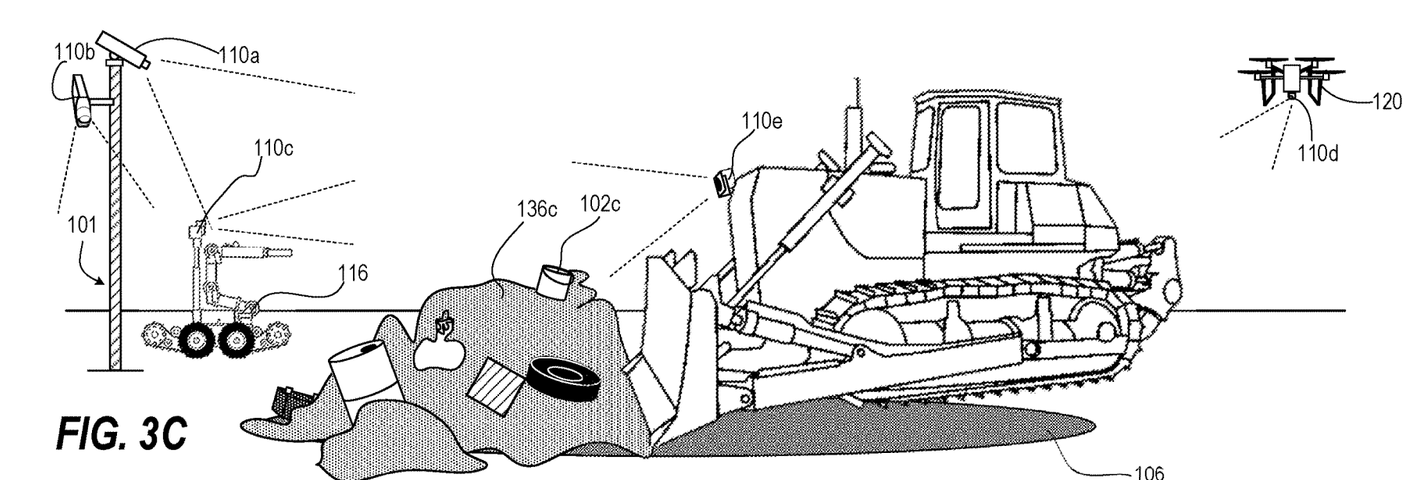
FIG. 3C is a third sequential isometric illustration of the municipal solid waste or recycling facility tip environment monitored by the tip assessment system of FIG. 1 as a facility vehicle repositions a portion of the first hauler-load.

FIG. 3C is a third sequential isometric illustration of tip location 106 monitored by tip assessment system 101 as a facility vehicle 304 repositions a portion of the first hauler-load 136c, exposing a third environmental contaminant item 102c, specifically a paint can. Fixed-location image capturing devices 110a-110b have vantage points to monitor repositioning first hauler-load 136c. A fifth image capturing device 110e positioned on facility vehicle 304 may have a vantage point to monitor repositioning of first hauler-load 136b-136c and environmental contaminant items 102a-102c. Robotic ground vehicle 116 and aerial drone 120 may be maneuvered to obtain vantage points by image capturing devices 110c and 110d to provide maximum possible viewing coverage of repositioned first hauler-load 136c.

Figure 3D:
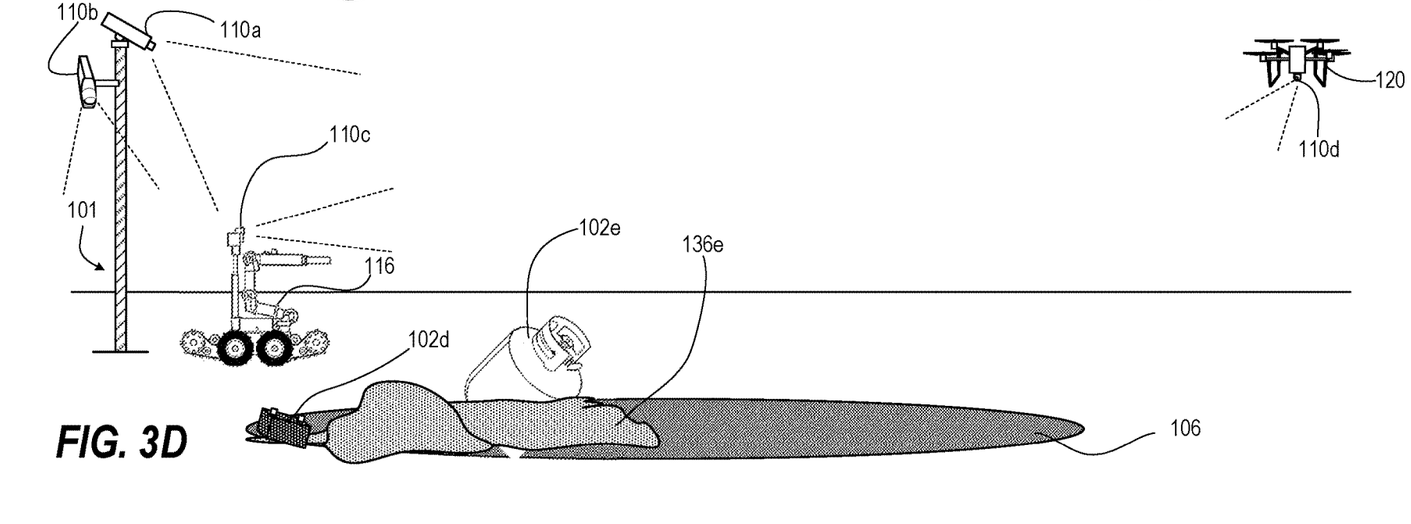
FIG. 3D is a fourth sequential isometric illustration of the municipal solid waste or recycling facility tip environment monitored by the tip assessment system of FIG. 1 including the repositioned first hauler-load.

FIG. 3D is a fourth sequential isometric illustration of tip location 106 with a repositioned first hauler-load 136d monitored by tip assessment system 101. Repositioned first hauler-load 136d was left with fourth and fifth environmental contaminant items 102d-102e exposed, specifically a vehicle battery and a propane tank while environmental contaminant items 102a-102c are no longer visible having been removed or covered by facility vehicle 304 during repositioning. Image capturing devices 102a-102d may view the remaining first hauler-load 136d from different vantage points, providing continuity of coverage even if one or more image capturing devices 102a-102d are reassigned to view other locations.

Figure 3E:
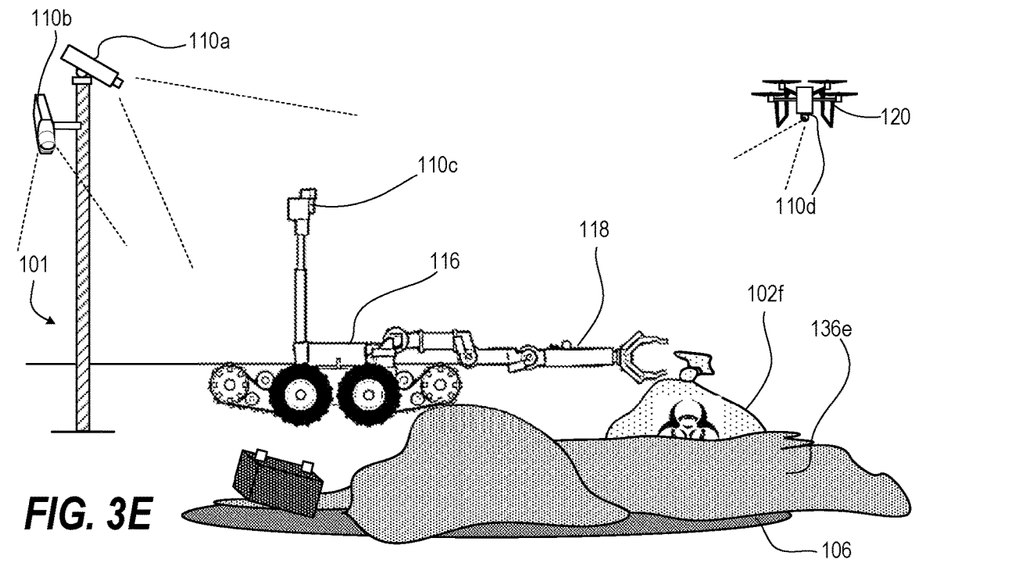
FIG. 3E is a fifth sequential isometric illustration of the municipal solid waste or recycling facility tip environment monitored by the tip assessment system of FIG. 1 including a robotic ground vehicle investigating the repositioned hauler-load.

FIG. 3E is a fifth sequential isometric illustration of tip location 106 with robotic ground vehicle 116 of the tip assessment system 101 maneuvering about tip location 106 using image capturing device 110c to visually investigate a remaining first hauler-load 136e. A portion of a sixth environmental contaminant item 102f is visible, specifically a bag labeled as a biohazard. In some embodiments, robotic ground vehicle 116 may be equipped with a robotic arm 118 with one or more end effectors that may be utilized to manipulate, move, and/or remove waste items from tip location 106. In the illustrated embodiment, robotic arm 118 is an articulable arm having a gripper end effector being extended towards environmental contaminant item 102f to reposition or remove it from remaining first hauler-load 136e. In alternative embodiments, robotic arm 118 and end effector may include one or more mechanical, electrical, magnetic, or hydraulic components known in the art, which may be used to manipulate one or more waste items within tip location 106. Image capturing devices 110a, 110b and 110d have different vantage points to confirm that robotic ground vehicle 116 did not introduce the sixth environmental contaminant item 102f to the municipal solid waste or recycling facility tip environment 100.

Figure 3F:
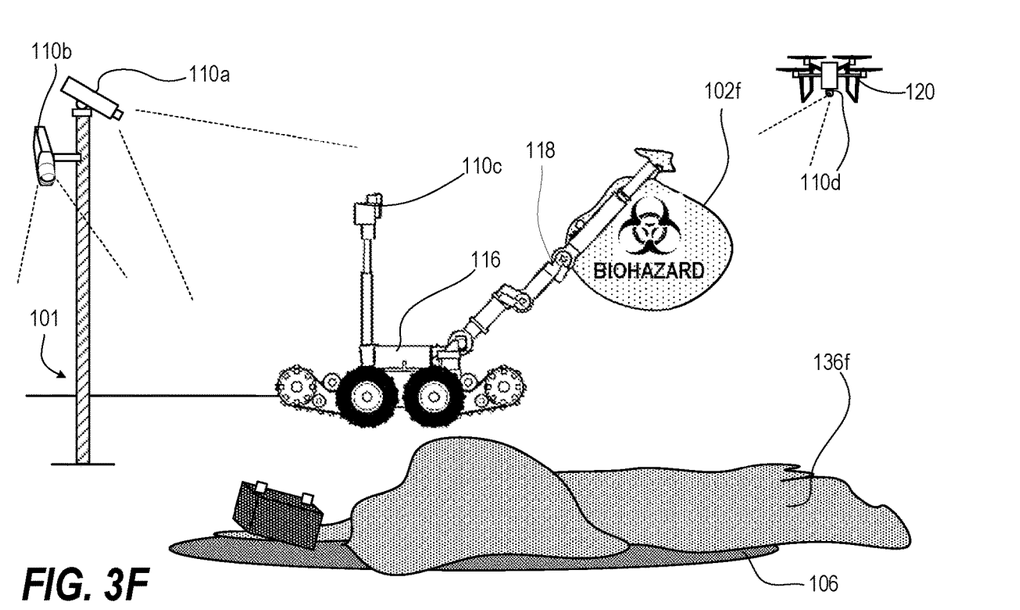
FIG. 3F is a sixth sequential isometric illustration of the municipal solid waste or recycling facility tip environment monitored by the tip assessment system of FIG. 1 depicting the robotic ground vehicle extracting an environmental contaminant item from the repositioned first hauler-load.

FIG. 3F is a sixth sequential isometric illustration of municipal solid waste or recycling facility tip environment 100 with robotic ground vehicle 116 extracting sixth environmental contaminant item 102f from the investigated first hauler-load 136f monitored by the tip assessment system 101. In the illustrated embodiment, robotic ground vehicle 116 uses robotic arm 118 to fully expose sixth environmental contaminant item 102f to confirm that it is a environmental contaminant item and to determine the type and size of environmental contaminant item detected. Image capturing devices 110a-110d have different vantage points to assist in this recognition of sixth environmental contaminant item 102f, confirmation that item 102f is a environmental contaminant item, and determination of the type and size of sixth environmental contaminant item 102f. In addition to image capturing devices 110a-110d, tip assessment system 101 may include one or more additional sensors such as chemical, air quality, magnetic, and/or radioactivity sensors to identify and/or confirm an identification of a environmental contaminant item.

Figure 3G:
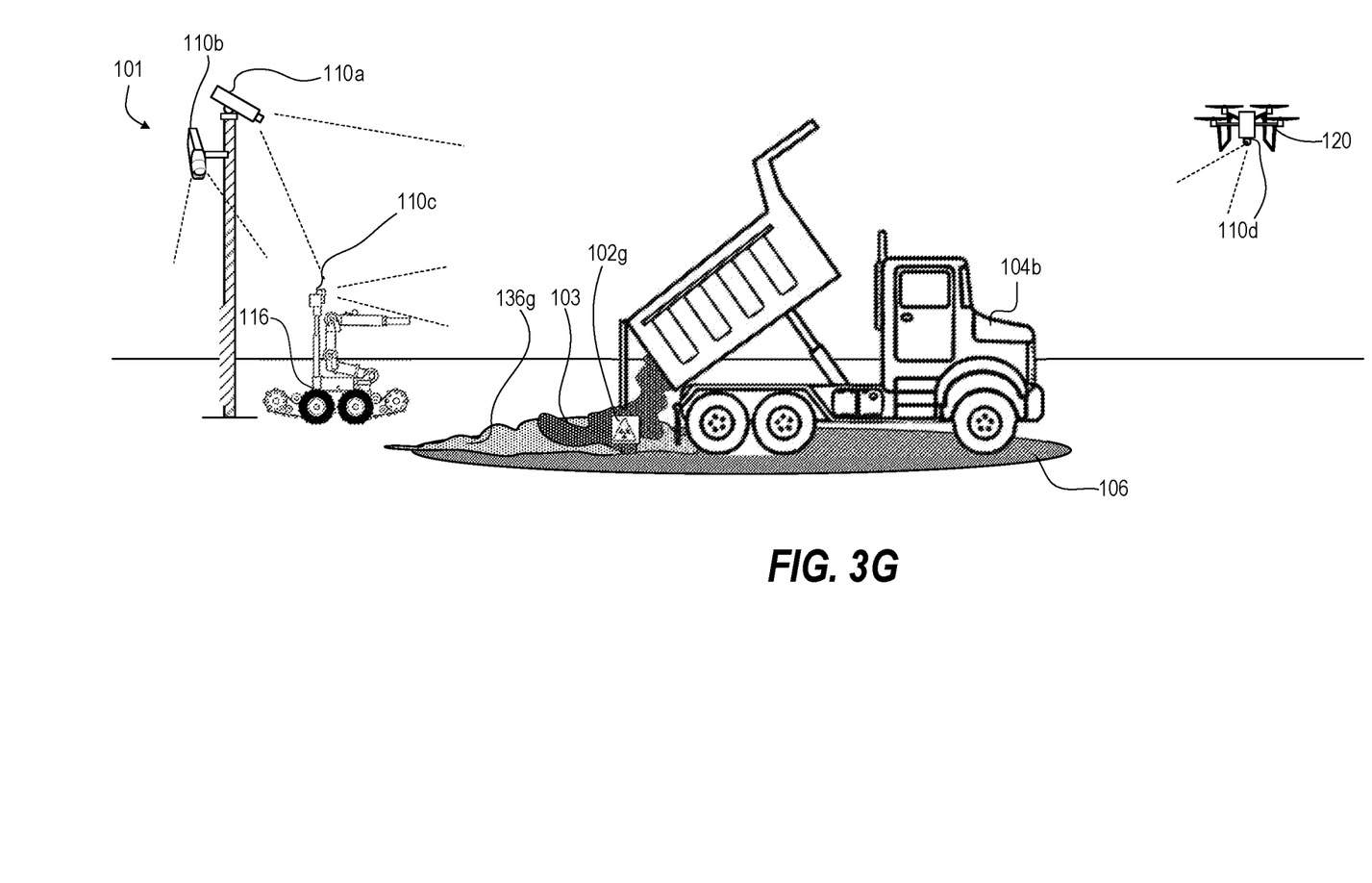
FIG. 3G is a seventh sequential isometric illustration of the municipal solid waste or recycling facility tip environment monitored by the tip assessment system of FIG. 1 with a second haul vehicle unloading a second hauler-load on or near a remainder of the first hauler-load.

FIG. 3G is a seventh sequential isometric illustration of municipal solid waste or recycling facility tip environment 100 with a second haul vehicle 104b unloading waste items onto a second hauler-load 136g monitored by the tip assessment system 101. A seventh environmental contaminant item 102g is exposed, specifically a box labeled as a radioactive hazard. Depending on how little waste item remained from prior hauler-loads, the tip assessment system 101 may unambiguously or ambiguously associate the seventh environmental contaminant item 102g with the second haul vehicle 104b. For example, in one embodiment, tip assessment system 101 may generate a map of overall tip location 106 and/or detected environmental contaminant item(s) 102 and authorized waste items 103 before second haul vehicle 104b unloads second hauler-load 136g at tip location 106, thereby allowing tip assessment system 101 to automatically attribute any new environmental contaminant item 102 to second haul vehicle 104b.

Figure 4:
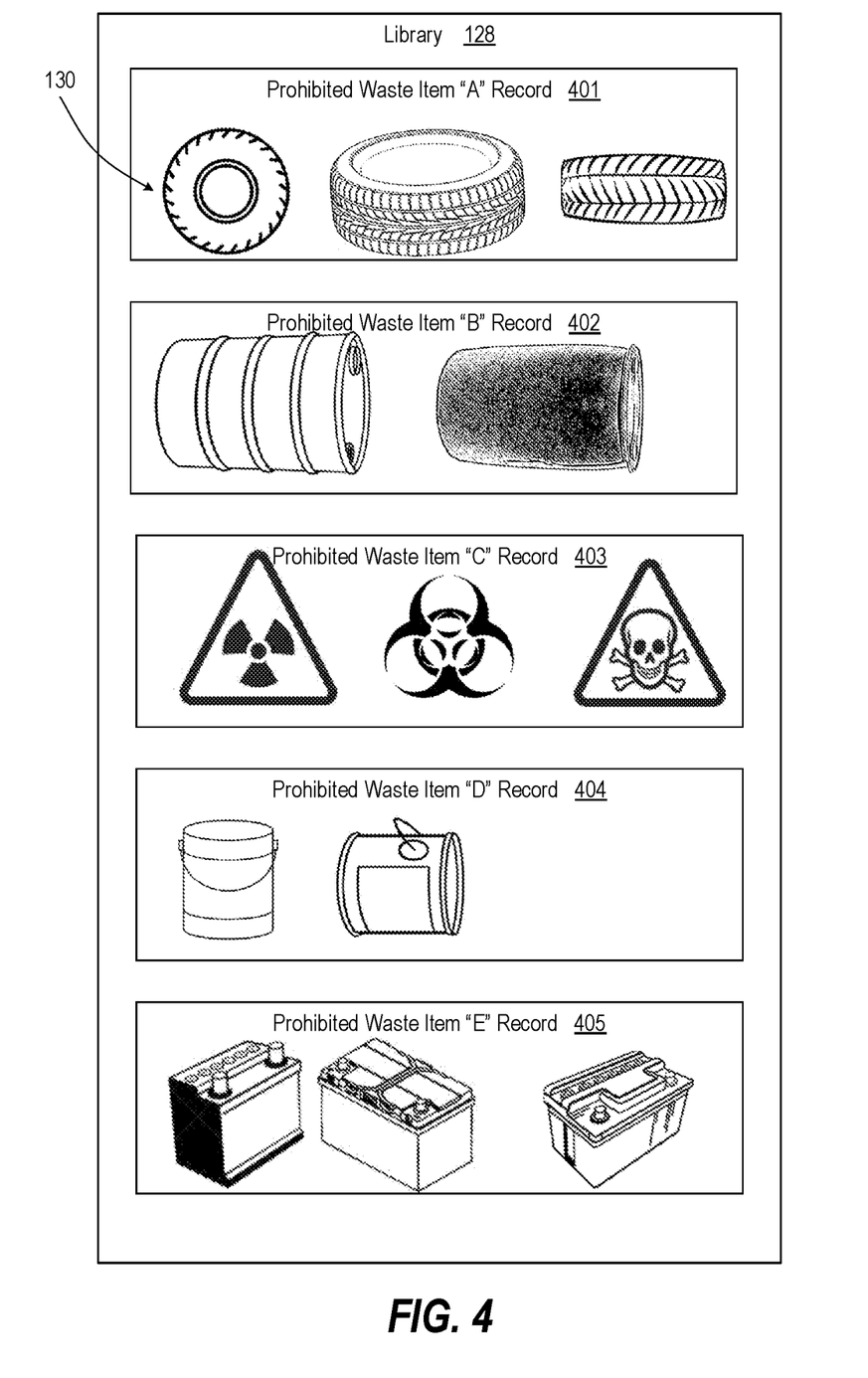
FIG. 4 is a diagrammatic illustration of an example library of environmental contaminant items referenced by the tip assessment system of FIG. 1.

FIG. 4 depicts a diagrammatic illustration of an example library 128 of environmental contaminant items referenced by the tip assessment system 101. Environmental contaminant item "A" record 401 has three (3) image characteristics 130 for different sizes, configurations, and orientations of vehicle tires. Environmental contaminant item "B" record 402 has two (2) image characteristics 130 for different sizes, configurations, and orientations of chemical barrels. Environmental contaminant item "C" record 403 has three (3) image characteristics 130 for different sizes, configurations, and orientations of hazardous material placards. Environmental contaminant item "D" record 404 has two (2) image characteristics 130 for different sizes, configurations, and orientations of paint cans. Environmental contaminant item "E" record 405 has three (3) image characteristics 130 for different sizes, configurations, and orientations of vehicle batteries. Image recognition engine 132 (FIG. 4) may obtain a two-dimensional correlation value for the extent that a shape matches one of the image characteristics 130. Image recognition engine 132 (FIG. 4) may utilize expert rules that define key structures, dimensions, colors, aspect ratios, etc. to recognize environmental contaminant items 102 (FIG. 1). Image recognition engine 132 (FIG. 4) may include a neural net trained to recognize particular shapes, portions of shapes, colors, signs, labels, etc. as having a high likelihood of being a environmental contaminant item 102 (FIG. 1). Depending on a confidence value in the determination, image recognition engine 132 (FIG. 4) may recommend human or robotic confirmation of the detected object in question.

Figure 5:
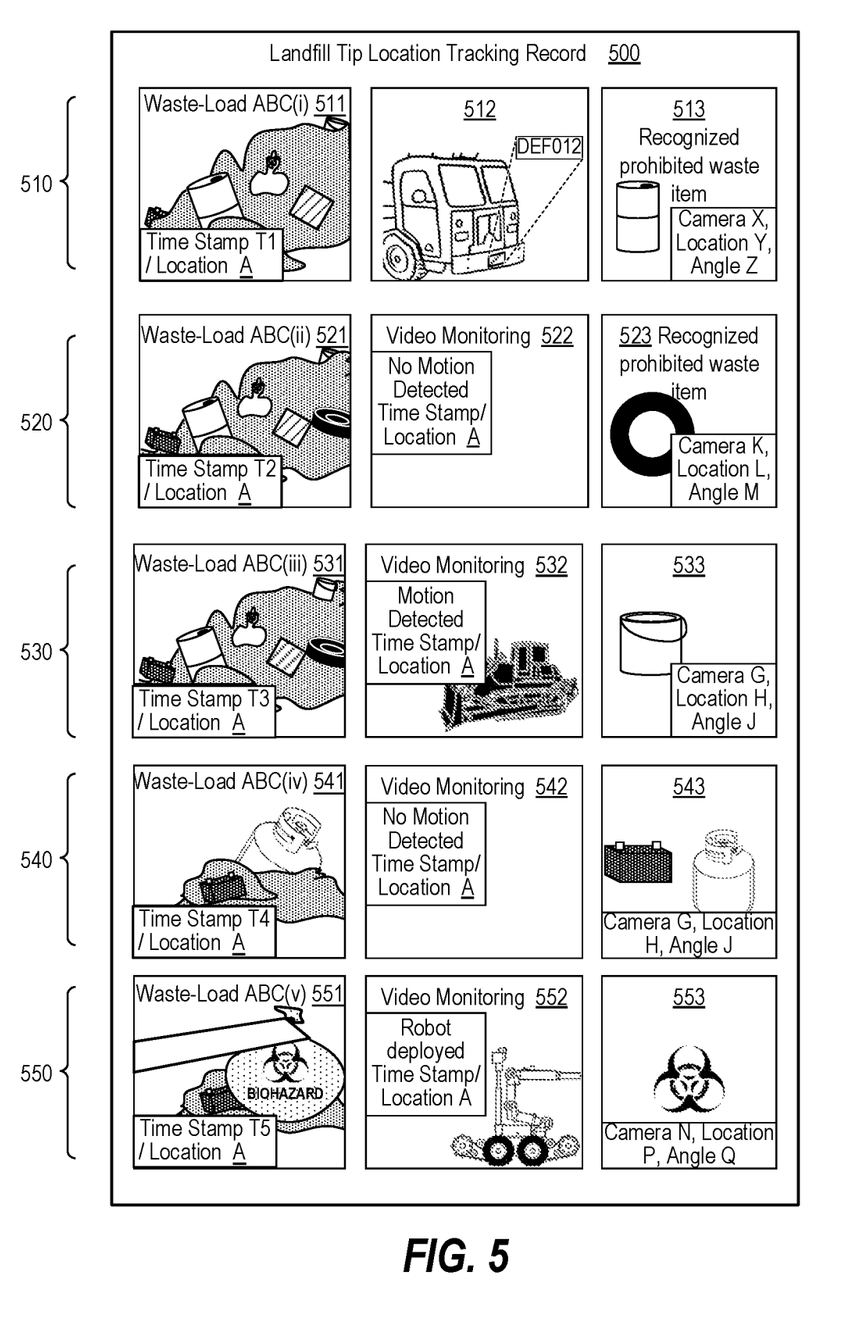
FIG. 5 is a diagrammatic illustration of an exemplary municipal solid waste or recycling facility tip tracking record generated by the tip assessment system of FIG. 1.

FIG. 5 depicts a diagrammatic illustration of an exemplary tip location tracking record 500 generated by the tip assessment system 101 (FIG. 1). For clarity, tracking record 500 may be depicted together as interwoven two-dimensional, human perceptible information derived from time stamps, location data, images, and object recognition information. In one or more embodiments, tip assessment system 101 (FIG. 1) maintains computer readable data from each source of location, time, and images that are verifiable and securely stored from which human-readable reports with salient information may be generated. Record 510 is at time T1 with a time/location stamped image 511 of the tip location from a rear vantage point that capture the hauler-load. Record 510 includes a time/location stamped image 512 of the tip location from a front vantage point that capture the vehicle identification. In one or more embodiments, record 512 is a motion activated video recording to capture vehicle information including the nature of interactions with the hauler-load. Record 510 includes an annotated image of a environmental contaminant item (i.e., a chemical barrel) that was recognized. Record 510 may correspond to the scenario depicted in FIG. 3A.

Record 520 is at time T2 with a time/location stamped image 521 of the tip location from a rear vantage point that capture the hauler-load. Record 520 includes a time/location stamped image 522 of the tip location from a front vantage point that captures no vehicle. Record 520 includes an annotated image of a environmental contaminant item (i.e., a vehicle tire) that was recognized. Record 520 may correspond to an interim scenario between those depicted in FIGS. 3B-3C.

Record 530 is at time T3 with a time/location stamped image 531 of the tip location from a rear vantage point that capture the hauler-load. Record 530 includes a time/location stamped image 532 of the tip location from a front vantage point that captures a facility vehicle. Record 530 includes an annotated image of a environmental contaminant item (i.e., a paint can) that was recognized. Record 530 may correspond to the scenario depicted in FIG. 3C.

Record 540 is at time T4 with a time/location stamped image 541 of the tip location from a rear vantage point that capture the hauler-load. Record 540 includes a time/location stamped image 542 of the tip location from a front vantage point that captures no vehicle. Record 540 includes an annotated image of environmental contaminant items (i.e., vehicle battery and propane tank) that was recognized. Record 540 may correspond to the scenario depicted in FIG. 3D.

Record 550 is at time T5 with a time/location stamped image 551 of the tip location from a vantage point of a robotic ground vehicle proximate to the hauler-load. Record 550 includes a time/location stamped image 552 of the tip location from a front vantage point that captures robotic ground vehicle. Record 550 includes an annotated image of an environmental contaminant item (i.e., bag of biohazardous waste) that was recognized. Record 550 may correspond to the scenario depicted in FIG. 3F.

Figure 6A:
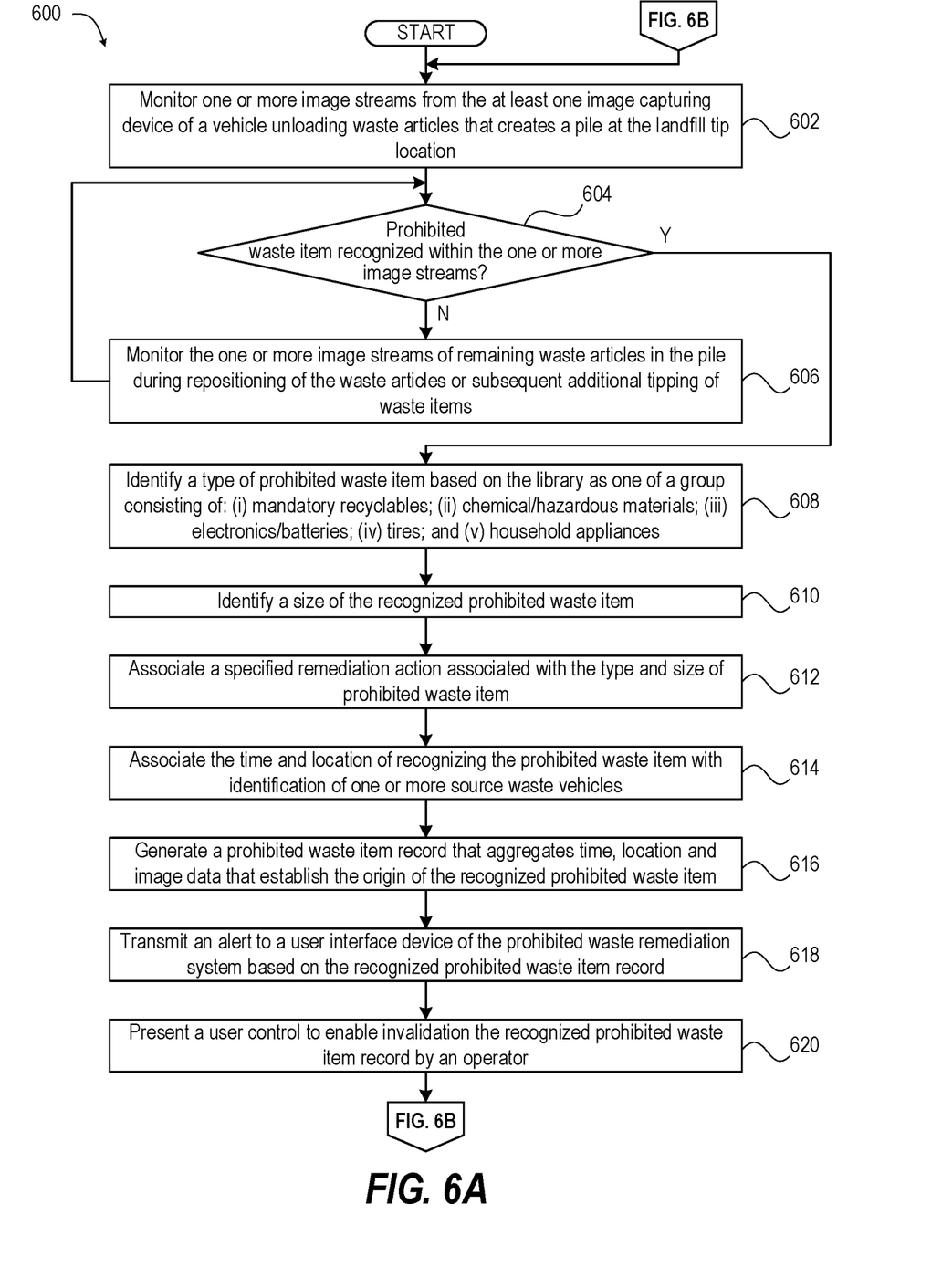
FIGS. 6A-6B are flowcharts depicting an exemplary disclosed method that may be performed by the system of FIG. 1.
Figure 6B:
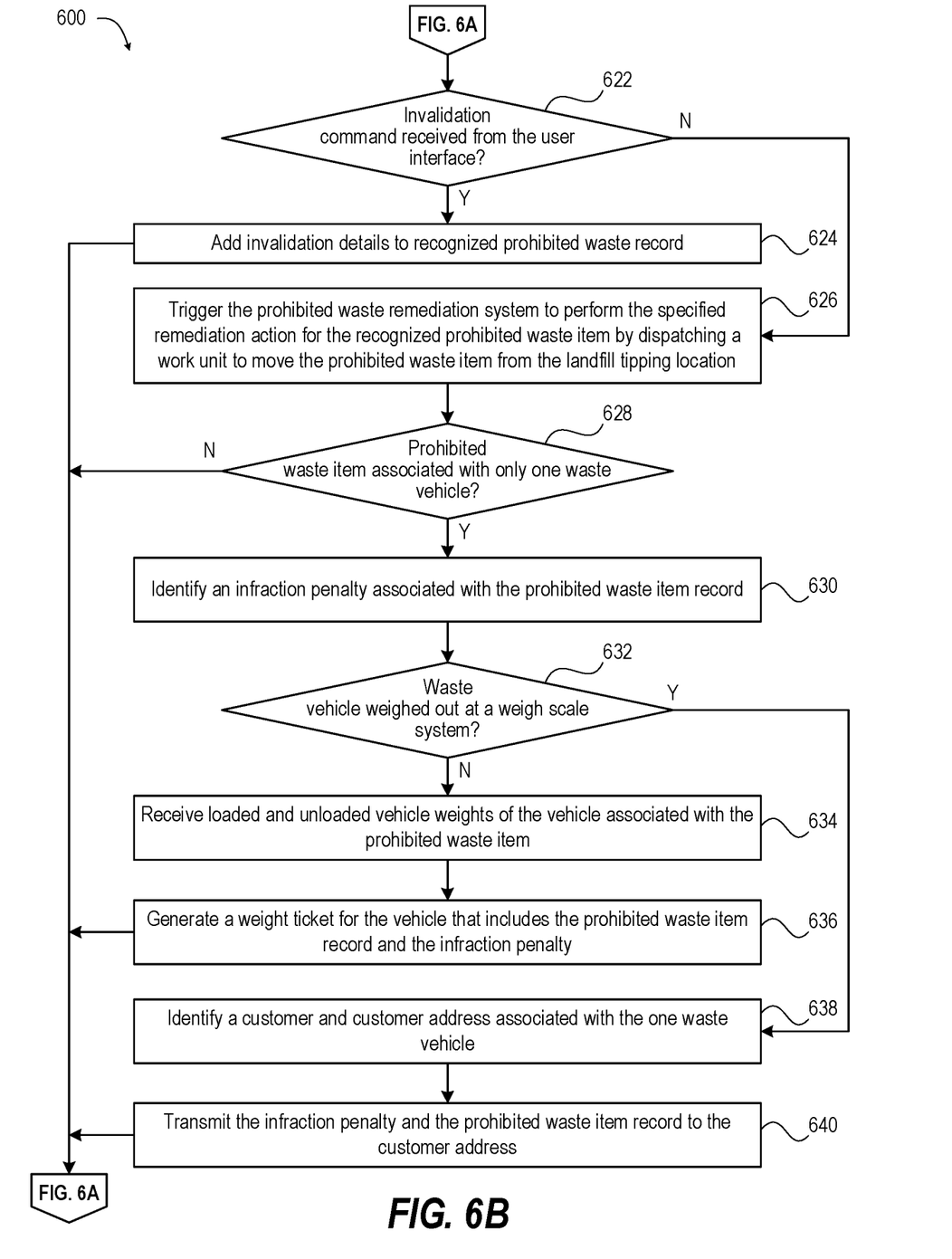

FIGS. 6A-6B present a flow diagram of a method 600 for automated detection and remediation of environmental contaminant item dumping at a municipal solid waste or recycling facility. Tip assessment system 101, managed by controller 108 (FIG. 1), may perform the method 600. With reference to FIG. 6A, method 600 includes monitoring one or more image streams from the at least one image capturing device of a vehicle unloading waste articles that creates a hauler-load at the tip location (block 602). Method 600 includes determining whether a environmental contaminant item is recognized within the one or more image streams (decision block 604). In response to determining that a environmental contaminant item is not recognized, method 600 includes monitoring the one or more image streams of remaining waste articles in the hauler-load during repositioning of the waste articles or subsequent additional tipping of waste items (block 606). Method 600 may then return to block 604. In response to determining that a environmental contaminant item is recognized in decision block 604, method 600 includes identifying a type of environmental contaminant item based on the library as one of a group of particular prohibited waste types, such as, for example, consisting of: (i) mandatory recyclables; (ii) chemical/hazardous materials; (iii) electronics/batteries; (iv) tires; and (v) household appliances (block 608). Method 600 includes identifying a size of the recognized environmental contaminant item (block 610). Method 600 includes associating a specified remediation action associated with the type and size of environmental contaminant item (block 612). Method 600 includes associating the time and location of recognizing the environmental contaminant item with identification of one or more source haul vehicles (block 614). Method 600 includes generating a environmental contaminant item record that aggregates time, location, and image data that establish the origin of the recognized environmental contaminant item (block 616). Method 600 transmitting an alert to a user interface device of the prohibited waste remediation system based on the recognized environmental contaminant item record (block 618). Method 600 includes presenting a user control to enable manual invalidation of the recognized environmental contaminant item record by an operator (block 620).

With reference to FIG. 6B, method 600 includes determining whether an invalidation command is received from the user interface (decision block 622). In response to receiving the invalidation command, method 600 includes adding invalidation details to recognized prohibited waste record (block 624). Method 600 then returns to block 602. In response to not receiving the invalidation command, method 600 includes triggering the prohibited waste remediation system to perform the specified remediation action for the recognized environmental contaminant item by dispatching a work unit to move the environmental contaminant item from the municipal solid waste or recycling facility tipping location (block 626). Method 600 includes determining whether the environmental contaminant item is associated with only one haul vehicle (decision block 628). In response to determining that the environmental contaminant item is not associated with only one haul vehicle, method 600 returns to block 602 (FIG. 6A).

In response to determining that the environmental contaminant item is not associated with only one haul vehicle, method 600 includes identifying an infraction penalty associated with the environmental contaminant item record (block 630). As an example, a certain number of infraction penalties can result in cancellation of facility access. Method 600 includes determining whether the one haul vehicle has weighed out at a weigh scale system (decision block 632). In response to determining that the one haul vehicle has not weighed out, method 600 includes receiving loaded and unloaded vehicle weights of the vehicle associated with the environmental contaminant item (block 634). Method 600 includes generating a weight ticket for the vehicle that includes the environmental contaminant item record and the infraction penalties (block 636). Then method 600 returns to block 602 (FIG. 6A). In response to determining that the one haul vehicle has weighed out in decision block 638, method 600 includes identifying a customer and customer address associated with the one haul vehicle (block 644). Method 600 includes transmitting the r infraction penalties and the environmental contaminant item record to the customer address (block 640). Then method 600 returns to block 602 (FIG. 6A).

It will be apparent to those skilled in the art that various modifications and variations may be made to the disclosed system. Other examples will be apparent to those skilled in the art from consideration of the specification and practice of the disclosed system. By way of non-limiting examples, magnets, buckles, buttons, or other attaching mechanisms could be used in the place of fastener surfaces. It is intended that the specification and examples be considered as illustrative only, with a true scope being indicated by the following claims and their equivalents.

What is claimed is:

1. A municipal solid waste or recycling facility tip assessment system comprising:
   a memory containing a library of one or more image characterizations of environmental contaminant items and an image recognition engine;
   a prohibited waste remediation system;
   at least one image capturing device positionable to have a field of view of a tip location; and
   a controller communicatively coupled to the memory, the prohibited waste remediation system, and the at least one image capturing device, the controller being configured to:
      monitor one or more image streams from the at least one image capturing device of a haul vehicle unloading waste articles of a hauler-load at the tip location;
      recognize within the one or more image streams, a location of one or more haul vehicles associated with a user, hauler-load, authorized waste items, tip location, and based on the library, an environmental contaminant item among the unloaded waste articles;
      update location and condition of the one or more haul vehicles from the one or more image streams in an electronic map of municipal solid waste or recycling facility;
      generate an environmental contaminant item record that aggregates time, location, and image data that establish that the recognized environmental contaminant item originates from the one or more haul vehicles; and
      transmit an alert to the prohibited waste remediation system based on the recognized environmental contaminant item record.

2. The municipal solid waste or recycling facility tip assessment system of claim 1, wherein the prohibited waste remediation system automatically dispatches one or more resources to remove the recognized environmental contaminant item from the hauler-load.

3. The municipal solid waste or recycling facility tip assessment system of claim 1, wherein:
   the prohibited waste remediation system comprises a user interface device; and
   the controller is configured to present a user control via the user interface device to accept or reject the environmental contaminant item record as a valid recognition.

4. The municipal solid waste or recycling facility tip assessment system of claim 1, wherein the controller is configured to:
   identify a type of environmental contaminant item based on the library;
   associate a specified remediation action associated with the type of environmental contaminant item; and
   trigger the prohibited waste remediation system to perform the specified remediation action for the recognized environmental contaminant item.

5. The municipal solid waste or recycling facility tip assessment system of claim 4, wherein the controller is configured to:
   identify a size of the recognized environmental contaminant item; and
   identify the type of environmental contaminant item based at least in part on the identified size.

6. The municipal solid waste or recycling facility tip assessment system of claim 4, wherein the controller is configured to identify the type of environmental contaminant item as one of a group consisting of: (i) mandatory recyclables; (ii) chemical/hazardous materials; (iii) electronics/batteries; (iv) tires; and (v) household appliances.

7. The municipal solid waste or recycling facility tip assessment system of claim 4, wherein:
   the prohibited waste remediation system comprises a vehicle weight scale; and the controller is configured to:
      identify an infraction penalty associated with the environmental contaminant item record;
      receive loaded and unloaded weights of the haul vehicle associated with the environmental contaminant item; and
      generate a weight ticket for the one or more haul vehicles that includes the environmental contaminant item record and the infraction penalty.

8. The municipal solid waste or recycling facility tip assessment system of claim 4, wherein:
   the prohibited waste remediation system comprises a dispatch system; and
   the controller is configured to trigger the prohibited waste remediation system to perform the specified remediation action for the recognized environmental contaminant item by dispatching a work unit to move the environmental contaminant item from the municipal solid waste or recycling facility tipping location.

9. The municipal solid waste or recycling facility tip assessment system of claim 1, wherein:
   the at least one image capturing device comprises:
      a first image capturing device positionable to have a second field of view of a rear portion of the haul vehicle at the tip location during the unloading of the waste items, and
      a second image capturing device positionable to have a third field of view of a front portion of the haul vehicle at the tip location to capture identifying markings on the haul vehicle during unloading of the waste items; and the controller associates the time and location of recognizing the environmental contaminant item to first and second image streams received respectively from the first and second image capturing devices.

10. The municipal solid waste or recycling facility tip assessment system of claim 1, wherein the controller:
monitors the one or more image streams of remaining waste articles in the hauler-load during repositioning of the waste articles;
recognizes an environmental contaminant item that is exposed during the repositioning of the waste articles; and
in response to determining that a weight ticket was previously generated indicating that the haul vehicle has departed:
identifies a customer and customer address associated with the haul vehicle,
identifies an infraction penalty associated with the environmental contaminant item record, and
transmits the infraction penalty and the environmental contaminant item record to the customer address.

11. The municipal solid waste or recycling facility tip assessment system of claim 10, wherein the controller:
monitors the one or more image streams from the at least one image capturing device of a second haul vehicle unloading waste articles that creates a second hauler-load at the tip location,
recognizes within the one or more image streams, based on the library, an environmental contaminant item included in the waste articles,
generates an environmental contaminant item record that aggregates time, location and image data that establish that the origin of the recognized environmental contaminant item was the second haul vehicle,
determines whether the second hauler-load includes remnants of the hauler-load;
in response to determining that the second hauler-load includes remnants of the hauler-load, transmits an alert to the prohibited waste remediation system based on the recognized environmental contaminant item record indicating an ambiguous association to one of the haul vehicle and the second haul vehicle; and
in response to determining that the second hauler-load does not include remnants of the hauler-load, transmits an alert to the prohibited waste remediation system based on the recognized environmental contaminant item record indicating association to the second haul vehicle.

12. A municipal solid waste or recycling facility management controller comprising:
a network interface communicatively coupled to a prohibited waste remediation system and at least one image capturing device positionable to have a field of view of a tip location;
a memory containing a library of one or more image characterizations of environmental contaminant items and an image recognition engine and a municipal solid waste or recycling facility management application; and
a hardware processor communicatively coupled to the prohibited waste remediation system, the network interface, the memory, and the at least one image capturing device, the hardware processor executes the municipal solid waste or recycling facility management application to configure the municipal solid waste or recycling facility management controller to:
monitor one or more image streams from the at least one image capturing device of a haul vehicle unloading waste articles of a hauler-load at the tip location;
recognize within the one or more image streams a location of one or more haul vehicles associated with a user, hauler-load, authorized waste items, tip location and, based on the library, an environmental contaminant item included in the waste articles;
update the location and condition of the one or more haul vehicles from the one or more image streams in an electronic map of municipal solid waste or recycling facility;
generate an environmental contaminant item record that aggregates time, location and image data that establish that the recognized environmental contaminant item originates from the haul vehicle; and
transmit an alert to the prohibited waste remediation system based on the recognized environmental contaminant item record.

13. A computer program product comprising:
a non-transitory computer readable medium; and
program code on the non-transitory computer readable medium that when executed by a hardware processor associated with a device, the program code enables a communication device to provide functionality of:
monitoring one or more image streams from at least one image capturing device positioned to have a field of view of a haul vehicle unloading waste articles that creates a hauler-load at a tip location,
recognizing within the one or more image streams one or more haul vehicles associated with a user, hauler-load, authorized waste items, tip location and, based on a library, an environmental contaminant item included in the waste articles, the library stored in memory communicatively coupled to the hardware processor and containing one or more image characterizations of environmental contaminant item and an image recognition engine,
update the location and condition of the one or more haul vehicles from the one or more image streams in an electronic map of municipal solid waste or recycling facility;
generating an environmental contaminant item record that aggregates time, location and image data that establish that the recognized environmental contaminant item originates from the haul vehicle; and
transmitting an alert to a prohibited waste remediation system based on the recognized environmental contaminant item record.

14. The computer program product of claim 13, wherein the program code enables the
communication device to provide functionality of:
transmitting the alert to a user interface device of the prohibited waste remediation system to enable intervention with the haul vehicle to prevent leaving the recognized environmental contaminant item in the hauler-load; and
presenting a user control via the user interface device to accept or reject the environmental contaminant item record as a valid recognition.

15. The computer program product of claim 13, wherein the program code enables the communication device to provide functionality of:
identifying a type of environmental contaminant item based on the library as one of a group consisting of: (i)

mandatory recyclables; (ii) chemical/hazardous materials; (iii) electronics/batteries; (iv) tires; and (v) household appliances;

identifying a size of the recognized environmental contaminant item;

associating a specified remediation action associated with the type and the size of the recognized environmental contaminant item; and triggering the prohibited waste remediation system to perform the specified remediation action for the recognized environmental contaminant item.

16. The computer program product of claim 13, wherein the program code enables the communication device to provide functionality of:

identifying an infraction penalty associated with the environmental contaminant item record;

receiving loaded and unloaded weights of the haul vehicle associated with the environmental contaminant item; and generating a weight ticket for the haul vehicle that includes the environmental contaminant item record and the infraction penalty.

17. The computer program product of claim 13, wherein the program code enables the communication device to provide functionality of triggering the prohibited waste remediation system to perform a specified remediation action for the recognized environmental contaminant item by dispatching a work unit to move the environmental contaminant item from the municipal solid waste or recycling facility tipping location.

18. The computer program product of claim 13, wherein the program code enables the communication device to provide functionality of:

receiving a first image from a capturing device positionable to have a second field of view of a rear portion of the haul vehicle at the tip location during the unloading of the waste items, receiving a second image from a capturing device positionable to have a third field of view of a front portion of the haul vehicle at the tip location to capture identifying markings on the haul vehicle during unloading of the waste items, and associating the time and location of recognizing the environmental contaminant item to first and second image streams received respectively from the first and second image capturing devices.

19. The computer program product of claim 13, wherein the program code enables the communication device to provide functionality of:

monitoring the one or more image streams of remaining waste articles in the hauler-load during repositioning of the waste articles;

recognizing the environmental contaminant item that is exposed during the repositioning of the waste articles; and in response to determining that a weight ticket was previously generated indicating that the haul vehicle has departed:

identifying a customer and customer address associated with the haul vehicle, identifying an infraction penalty associated with the environmental contaminant item record, and transmitting the infraction penalty and the environmental contaminant item record to the customer address.

20. The computer program product of claim 13, wherein the program code enables the communication device to provide functionality of:

monitoring the one or more image streams from the at least one image capturing device of a second haul vehicle unloading waste articles that creates a second hauler-load at the tip location, recognizing within the one or more image streams, based on the library, an environmental contaminant item included in the waste articles, generating an environmental contaminant item record that aggregates time, location and image data that establish that the recognized environmental contaminant item originates from the second haul vehicle, determining whether the second hauler-load includes remnants of the hauler-load; in response to determining that the second hauler-load includes remnants of the hauler-load, transmitting an alert to the prohibited waste remediation system based on the recognized environmental contaminant item record indicating an ambiguous association to one of the haul vehicle and the second haul vehicle; and in response to determining that the second hauler-load does not include remnants of the hauler-load, transmitting an alert to the prohibited waste remediation system based on the recognized environmental contaminant item record indicating association to the second haul vehicle.

* * * * *